United States Patent [19]

Bujadoux

[11] 4,263,170
[45] Apr. 21, 1981

[54] CATALYSTS COMPRISING MAGNESIUM AND TRANSITION METAL

[75] Inventor: Karel Bujadoux, Lens, France

[73] Assignee: Societe Chimique des Charbonnages - CdF Chimie, Paris, France

[21] Appl. No.: 36,167

[22] Filed: May 4, 1979

[30] Foreign Application Priority Data

May 5, 1978 [FR] France .................................. 78 13416

[51] Int. Cl.$^3$ ............................. C08F 4/64; C08F 4/62
[52] U.S. Cl. .................................. 252/429 C; 252/441; 526/125; 526/126; 526/159
[58] Field of Search ............................. 252/429 C, 441

[56] References Cited

U.S. PATENT DOCUMENTS

| | | | |
|---|---|---|---|
| 3,048,571 | 8/1962 | Stroh et al. | 252/441 X |
| 3,058,969 | 10/1962 | Coover et al. | 252/429 C X |
| 3,216,988 | 11/1965 | Coover et al. | 252/429 C X |
| 3,478,008 | 11/1969 | Ledbetter | 252/429 C X |
| 3,770,657 | 11/1973 | Haag et al. | 252/429 C X |
| 3,784,481 | 1/1974 | Lassau et al. | 252/429 C X |
| 3,969,332 | 7/1976 | Gloriod et al. | 252/429 A X |

FOREIGN PATENT DOCUMENTS

| | | |
|---|---|---|
| 906981 | 8/1972 | Canada . |
| 1150640 | 4/1969 | United Kingdom . |
| 1157925 | 7/1969 | United Kingdom . |

*Primary Examiner*—Patrick Garvin
*Attorney, Agent, or Firm*—Finnegan, Henderson, Farabow, Garrett & Dunner

[57] ABSTRACT

A catalyst comprising the product obtained by bringing into contact (a) a compound of magnesium comprising at least one species selected from the group consisting of magnesium monohalides (MgX), halo-magnesium hydrides (HMgX) and magnesium hydride (MgH$_2$), X being a halogen and the said species MgX or HMgX being obtained by thermal decomposition of a powdery organo-magnesium halide R$_1$MgX wherein R$_1$ is an organic radical; and (b) at least one halide of a transistion metal selected from the group consisting of titanium and vandium, the valency of said metal in said halide being lower than or equal to 3, the quantities of (a) and (b) being such that the atomic ratio of magnesium to said transistion metal is between 1 and 25, and a catalyst system including the catalyst that is suitable for use in the polymerization of olefins and particularly ethylene.

19 Claims, No Drawings

CATALYSTS COMPRISING MAGNESIUM AND TRANSITION METAL

The present invention relates to new catalysts comprising magnesium and a transition metal that are particularly suitable for the polymerization of olefins and to a process for the preparation of these catalysts.

BACKGROUND OF THE INVENTION

Different catalysts comprising monovalent magnesium and a transition metal are already known and they have been used before for the polymerization of olefins. U.S. Pat. No. 3,048,571, for example, describes catalysts which are combinations of monovalent magnesium compounds, which may be obtained either by electrolytic reduction or by pyrolysis of an aryl-magnesium halide, and polyvalent compounds of metals of subgroups IV to VI of the Periodic Table, the molar ratio of the monovalent magnesium to said polyvalent compounds ranging between 0.1 and 10. These catalysts are used for the polymerization of olefins in inert liquid organic solvents, at temperatures ranging between 0° C. and 350° C. and under pressures of 1 to 300 bars. British Pat. No. 1,150,640 also describes catalyst mixtures comprising a transition metal compound of groups IV to VIII of the Periodic Table and a monovalent compound of magnesium obtained by thermal decomposition under reduced pressure and at temperatures of 190° C. to 240° C. of an aryl-magnesium halide prepared in the presence of an ether or a hydrocarbon, the molar ratio of the monovalent magnesium compound of said transition metal compound ranging between 10 and 50.

In the above patents the use of these catalysts is said to have numerous advantages because it evades the danger of employing inflammable compounds which sometimes ingite spontaneously such as trialkylaluminum (See column 2, lines 17-21 of U.S. Pat. No. 3,048,571). However, the catalytic yields in the polymerization are weak and it is necessary to wash the polymer in order to obtain commercial qualities.

Catalysts obtained by contacting a titanium or vanadium halide with anhydrous magnesium dihalide are also known. They are described, for example, in French Pat. No. 2,023,789. The use of these catalysts for the polymerization of ethylene under high pressures and temperatures allows fairly high yields while avoiding polymer washing. The use of these catalysts, however, gives ethylene polymers having a proportion of very high molecular weights which is not sufficient, particularly in the case of polymers having a melt index lower than 2 dg/mn that are to be shaped by extrusion-blowing. Those polymers which have a sufficient proportion of very high molecular weights also have weak mechanical properties, particularly their breaking strength.

SUMMARY OF THE INVENTION

An object of the present invention is to provide catalysts having good thermal stability up to 350° C. and which are prepared by a simple process. Another object of the present invention is to provide a process for the preparation of polyolefins and in particular, a process for preparing ethylene polymers which have a density ranging between 0.905 and 0.960 g/cm$^3$ and a melt index ranging between about 0.1 and 100 dg/mn. A further object of the invention is to provide a process for preparing ethylene polymers having a melt index between about 0.1 and 2 dg/mn and having a sufficiently high proportion of very high molecular weights to improve their mechanical properties.

To achieve the foregoing objects and in accordance with the purpose of the present invention, the catalysts comprise the product obtained by bringing into contact:
(a) a magnesium compound comprising at least one species selected from the group consisting of the monohalides of magnesium (MgX), the hydrides of halomagnesium (HMgX) and magnesium hydride (MgH$_2$), X being a halogen and the said species MgX or HMgX being obtained by thermal decomposition of a powdery organo-magnesium halide R$_1$MgX wherein R$_1$ is an organic radical; and
(b) at least one halide of a transistion metal selected from the group consisting of titanium and vanadium in which the metal has a valency lower than or equal to 3, the quantities of (a) and (b) being such that the atomic ratio of the magnesium to said transition metal is between 1 and 25.

DETAILED DESCRIPTION

Halides of a transitional metal (b) particularly suitable for the present invention are titanium trichloride TiCl$_3$, preferably syncrystallized with aluminum chloride AlCl$_3$ under the form TiCl$_3$ ⅓ AlCl$_3$, and being usually named violet TiCl$_3$, titanium dichloride TiCl$_2$, vanadium trichloride VCl$_3$ and mixtures of these halides.

Suitable magnesium compounds (a) for the present invention are, in particular, magnesium hydride MgH$_2$ and the products obtained by thermal decomposition of powdery organo-magnesium compounds of the formula R$_1$MgX where R$_1$ is an organic radical and preferably a hydrocarbon radical.

Powdery organo-magnesium compounds are described in French Pat. No. 2,370,054. Their thermal decomposition in controlled temperature conditions leads to compounds containing the species HMgX and having the formula:

$$(HMgX)(MgX_2)_a(MgH_2)_b[Mg(OR)_2]_c$$

wherein R is a hydrocarbon radical, $0 \leq a \leq 0.75$, $0 \leq b \leq 0.7$ and $0 \leq c \leq 0.25$. Further thermal decomposition of the organo-magnesium halides leads, under controlled conditions, to compounds containing the species MgX and having the formula:

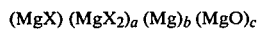

$$(MgX)(MgX_2)_a(Mg)_b(MgO)_c$$

in which a, b and c are the same as above.

The formulae of the species HMgX and MgX according to the invention are complex because they are obtained from powdery organo-magnesium halides which have a complex nature. Most often their structure is such that $0.1 \leq a \leq 0.5$, $0 \leq b \leq 0.45$ and $0 \leq c \leq 0.25$. X is preferably chlorine or bromine and radicals R$_1$ are preferably aliphatic radicals. The catalysts according to the invention may also comprise one or more inert supports; for example, calcium, zinc, chromium, manganese, iron, cobalt or nickel dihalides, magnesium hydroxide or carbonate, silica, alumina, magnesia and eventually one or more complexing agents, for example, ethers, amines, etc.

According to the present invention, bringing compounds (a) and (b) into contact means efficiently mixing these compounds, for example, by crushing them together in a perfectly inert atmosphere for a sufficient length of time which can be easily determined by a man skilled in the art. The compounds (a) used for the manufacture of catalysts of the present invention are characterized by their high specific surface. The species HMgX, the hydride of halo-magnesium, for example, are characterized by a specific surface greater than 150 m2/g, determined by using a sorptmeter standardized according to BS 4359/1 standard. The species MgX, the monohalide of magnesium, are characterized by a specific surface greater than 50 m²/g, also determined by using the above-mentioned standard.

As discussed, the catalysts according to the present invention may be obtained by bringing the compounds (a) and (b) into contact. This reaction is not difficult to perform when the compound (a) contains only the species $MgH_2$ which is a commercial product. In this case, before contacting this compound (a) with compound (b) it is necessary to dry completely this compound (a). When the compound (a) contains the species HMgX or MgX the preparation process is as follows: as a first step, a powdery organo-magnesium halide is prepared (for example, according to the process described in French Pat. No. 2,370,054); in a second step the powdery organo-magnesium halide is decomposed by thermal decomposition in controlled temperature conditions; and in a third step the product obtained by thermal decomposition is contracted with at least one halide (b).

By controlled temperature conditions is meant that the temperatures in the second step of the process is chosen on the one hand according to the nature of the organo-magnesium halide obtained in the first step and more particularly by the radical $R_1$ of the halide and on the other hand according to the magnesium species which has to be contacted with the halide (b) in the third step. Thus, when the radical $R_1$ is an aliphatic radical, the decomposition of the powdery organo-magnesium halide takes place in two steps as the temperature is raised. When the temperature ranges between 170° and 220° C., the decomposition leads at first to the species HMgX having the formula noted hereabove. When the temperature is greater than 300° C., the decomposition goes on and the species HMgX is converted into the species MgX. When the radical $R_1$ is an aromatic radical, the decomposition of the organo-magnesium halide leads to the species MgX having the hereabove-mentioned formula when the temperature exceeds 250° C.

The first step of the process of the present invention is advantageously performed as described in U.S. Pat. No. 4,187,254 by reacting an organic monohalide $R_1X$ with magnesium which is under the form of massive convex grains measuring between about 1 and 15 mm, the reaction temperature being lower than the decomposition temperature of the organo-magnesium halide and higher by at least 10° C. than the boiling point of the organic monohalide under the reaction pressure. This method leads to powdery products in which indexes a and b have the hereabove-mentioned value and represent respectively the quantities of magnesium dihalide and of magnesium hydride and index c is zero. When the reaction takes place in the presence of a metallic derivative of an organic compound comprising a hydroxy function or an enolyzable ketone function, for example, by adding an alcohol to the reaction medium, the process leads to powdery products in which the index c, which represents the quantity of magnesium alcoholate, is not zero but has the above-mentioned value.

Catalysts according to the present invention are particularly useful for polymerizing olefins, particularly ethylene. They are used to obtain a catalytic system further comprising an activator chosen among hydrides and organo-metallic compounds of groups I to III of the Periodic Table in an amount such that the atomic ratio of the metal of said activator to the transistion metal is between 0.1 and 100. More particularly, the preferred activators are either alkylaluminums or alkylsiloxalanes such as those described in U.S. Pat. No. 3,969,332.

Further objects of the present invention are achieved by carrying out the process of the invention according to which α-olefins having 2 to 8 atoms of carbon are polymerized or copolymerized at temperatures ranging between 20° and 350° C., at a pressure between 1 and 2,500 bars, in the presence of the catalytic system described hereabove. The olefins used in the process of the present invention are ethylene, propene, 1-butene, 4-methyl-1-pentene, 1-hexene, and 1-octene. At first the process of the invention relates to the so-called "low pressure process," according to which olefins are polymerized at temperatures of between 20° and 200° C., in solution or in suspension in an inert liquid hydrocarbon having at least six carbon atoms and being an aliphatic, saturated cycloaliphatic or aromatic hydrocarbon, the polymerization pressure being from 1 to 200 bars. The process according to the invention also relates to a so-called "high pressure process" which is preferably applicable to the polymerization or copolymerization of ethylene at temperatures of 180° to 350° C., under pressures of 400 to 2,500 bars, the reaction being effected in solution in the monomer. For this last process, when temperature and/or pressure are not high, it is possible to use an inert hydrocarbon having preferably less than 5 carbon atoms such as propane or butane. When a "high pressure" process is used, the average residence time of the catalyst system in the polymerization reactor according to the invention, is advantageously between 2 and 100 seconds and is a function of the temperature in the reactor, i.e., this residence time increases when the temperature decreases. When a "low pressure" process is effected, the average residence time of the catalyst in the reactor is generally equal to several minutes and may go up to several hours.

Owing to their powdery nature, the catalysts are particularly suitable for fluidized bed olefin polymerization processes such as those described for example in French Pat. No. 1,578,481 and in U.S. Pat. No. 3,790,036.

When the "high pressure" process is performed in an autoclave or tubular reactor having several reactive zones in order to produce some definite qualities of polymers, it is advantageous to use a particular arrangement of the polymerization unit as described for example in French Pat. Nos. 2,346,374 and 2,385,745. In order to control the melt index of the polymer, in particular of polyethylene, it is useful to effect the polymerization in the presence of a transfer agent such as hydrogen. In the high pressure process, the amount of transfer agent used is equal to 0.04 to 2 percent by volume based on ethylene. When using hydrogen for carrying out the process of the invention, the melt index is very sensitive to the hydrogen amount and varies noticeably with this amount.

According to the process of the present invention applied to polymerization or copolymerization of ethylene, various polymers be prepared having a density between 0.905 and 0.960 g/cm³ and a melt index between about 0.1 and 100 dg/mn. Polymers having a density which is relatively low, for example comprised between 0.905 and 0.935 g/cm³ are obtained by copolymerizing ethylene with an α-olefin having from 3 to 8 carbon atoms, for example propene, in an amount equal to 15 to 35 percent by weight. According to the invention is is possible to manufacture ethylene polymers having a melt index between about 0.1 and 2 dg/mn and having a high proportion of very high molecular weights, therefore improving some of their mechanical properties.

The following examples are given by way of illustration only and are not to be considered limiting of the invention.

EXAMPLE 1

Through the top part of a vertical cylindrical reactor provided with a grid in its lower part and filled with magnesium in the form of small cylinders of length 3 to 4 mm cut out from a ribbon, n-butyl chloride is introduced by means of a dosing pump. A countercurrent of dry nitrogen is introduced through the base of the reactor. An intense friction between the magnesium grains is ensured by means of a mechanical stirrer. By maintaining a grid temperature of 135° C., a perfectly white powder of n-butylmagnesium chloride is obtained. This powder is first degassed under reduced pressure at 50° C. in order to eliminate possibly occluded gases as well as any volatile product. In practice, this degassing does not appear to be indispensable as the loss of weight undergone by the sample is less than 1%.

The degassed powder is then placed in an oven in which the temperature is regulated at 210° C. and is maintained there for three hours. The gases issuing from the decomposition, constituted by a mixture of butenes and butanes, are analyzed periodically by gas phase chromatography. The dosage of the constituents of these gases, together with the ponderal and thermogravimetric analysis of the starting powder, enables the following formula to be established for the thermally decomposed powder:

$$(HMgCl) (MgCl_2)_{0.38} (MgH_2)_{0.19}$$

Its specific surface is equal to 154 m²/g, measured with a sorptmeter standardized according to standard BS 4359/1.

EXAMPLE 2

In the apparatus described in Example 1, n-butyl bromide is reacted with magnesium in the form of massive grains, maintaining a grid temperature of 120° C. The white powder of n-butylmagnesium bromide which is collected is degassed at 50° C., then maintained for four hours and a half in an oven at a temperature regulated at 210° C. The dosage by gas phase chromatography of the gases issuing from the decomposition, together with the ponderal and thermogravimetric analysis of the starting powder, enables the following formula to be established for the thermally decomposed powder:

$$(HMgBr) (MgBr_2)_{0.186}$$

EXAMPLE 3

A powder of n-butylmagnesium chloride is prepared by the method of Example 1, with the exception that the grid temperature is maintained at 130° C.

The powder thus obtained is subjected to ponderal analysis, then degassed at 50° C. and placed in an oven. The temperature of the oven is maintained at 210° C. for a duration of 3 and a half hours, following which the powder has undergone a loss of weight of 40.33%, then at 330° C. for a duration of 3 hours, following which the loss of weight reaches 40.76%. These data, combined with those of the ponderal analysis, enable the following formula to be established for the powder decomposed at 330° C.:

$$(MgCl) (MgCl_2)_{0.25} (MgH_2)_{0.06}$$

The specific surface measured as in Example 1 is equal to 54 m²/g.

EXAMPLE 4

A powder of n-butylmagnesium chloride is prepared by the method of Example 1, with the exception that the grid temperature is maintained at 126° C. and about 20% by mole of n-butanol is added to the butyl chloride. The powder thus obtained is subjected to ponderal analysis, then degassed at 50° C. and placed in an oven. The temperature of the oven in maintained at 215° C. for a duration of 5 hours, following which the powder has undergone a loss of weight of 27.4%. This data, combined with that of the ponderal analysis, enables the following formula to be established for the decomposed powder:

$$(HMgCl) (MgCl_2)_{0.45} (MgH_2)_{0.05} [Mg(OC_4H_9)_2]_{0.23}$$

EXAMPLES 5 to 14

The compound (a) of the catalyst according to the invention constituted either by one of the powdery compounds described in examples 1 to 4 or by magnesium hydride MgH₂ which is a powdery, substantially anhydrous product, is crushed with violet titanium chloride (TiCl₃ 1/3 AlCl₃) sold by TOHO TITANIUM under the trademark TAC 191, in such a quantity that the atomic ratio Mg/Ti is equal to a value indicated hereunder in Table 1. The catalyst thus prepared is suspended in a $C_{11}-C_{12}$ hydrocarbon cut and activated by trioctylaluminum in an amount such that the atomic ratio Al/Ti is equal to 8.

In a steel autoclave reactor containing 1 liter there are introduced 600 ml of the cut $C_{11}-C_{12}$ described hereabove, then ethylene until saturation at a pressure of 6 bars, then the catalytic suspension which has been preliminarily prepared. The ethylene polymerization is carried out at a temperature of 200° C. for one minute and by maintaining a constant pressure of ethylene equal to 6 bars. At the end of this time the suspension is recovered and the polymer separated by filtration after cooling. The catalytic yield $R_c$ indicated in table I is given in grams of polymer per gram of titanium per minute per atmosphere.

TABLE I

| Example | 5 | 6 | 7 | 8 | 9 |
|---|---|---|---|---|---|
| (a) | 1 | 1 | 1 | 2 | 3 |
| Mg/Ti | 10 | 5,8 | 2,2 | 5,7 | 21,3 |
| $R_c$ | 382 | 422 | 378 | 476 | 463 |

TABLE I-continued

| Example | 10 | 11 | 12 | 13 | 14 |
|---|---|---|---|---|---|
| (a) | 3 | 3 | 4 | 4 | $MgH_2$ |
| Mg/Ti | 9,1 | 2 | 6 | 10 | 2 |
| $R_c$ | 463 | 301 | 431 | 344 | 310 |

EXAMPLES 15 to 17

The compound (2) of the catalyst according to the invention constituted by one of the powdery compounds described in Examples 2, 3 and 4 is crushed with violet titanium chloride TAC 191 in such a quantity that the atomic ratio Mg/Ti is equal to 2. The catalyst obtained is suspended in a $C_{11}$-$C_{12}$ hydrocarbon cut already described, then activated by triocytaluminum in an amount such that the atomic ratio Al/Ti=100.

In a reactor containing 1 liter are introduced 600 ml of the cut $C_{11}$-$C_{12}$ described hereabove, then ethylene until saturation at the atmospheric pressure, then the catalytic suspension which has been preliminarily prepared. The theylene polymerization is carried out at the temperature of 80° C. for one hour by maintaining a constant pressure of ethylene of 1 bar. At the end of this time, suspension is recovered and the polymer separated by filtration after cooling. The catalytic yield $R_c$ indicated in table II is measured in kilograms of polymer per gram of titanium per hour and by atmosphere.

TABLE II

| Example | 15 | 16 | 17 |
|---|---|---|---|
| (a) | 2 | 3 | 4 |
| $R_c$ | 9.3 | 8.9 | 13.7 |

EXAMPLES 18 to 26

The compound (a) of the catalyst according to the invention, constituted either by one of the powdery compounds described in Examples 1 and 3 or by magnesium hydride $MgH_2$ which is a powdery, substantially anhydrous product, is crushed with violet titanium chloride TAC 191 for 2 hours (in Example 18, it has been used in an equimolecular mixture constituted of TAC 191 and vanadium chloride instead of TAC 191 alone) in such a quantity that the atomic ratio Mg/Ti (Mg/[Ti+V] in Example 18) is equal to a value indicated in Table III. The catalyst thus prepared is suspended in a $C_{11}$-$C_{12}$ hydrocarbon cut and activated by dimethylethyldiethylsiloxane in an amount such that the atomic ratio Al/Ti (Al/[Ti+V] in Example 18) is equal to 8 (in Examples 21 and 22 the atomic ratio is respectively 4 and 0.3).

The ethylene polymerization is effected by the method described in Examples 5 to 14. Table III indicates catalytic yield $R_c$ in grams of polymer per gram of titanium per minute and per atmosphere.

TABLE III

| Example | 18 | 19 | 20 | 21 | 22 |
|---|---|---|---|---|---|
| (a) | 1 | 1 | 1 | 1 | 1 |
| Mg/Ti | 3 | 23 | 10 | 3 | 3 |
| $R_c$ | 306 | 415 | 415 | 406 | 219 |

| Example | 23 | 24 | 25 | 26 |
|---|---|---|---|---|
| (a) | 1 | 3 | 3 | $MgH_2$ |
| Mg/Ti | 1 | 9,9 | 3 | 2 |
| $R_c$ | 169 | 463 | 434 | 241 |

EXAMPLES 27 to 40

A catalyst, obtained by crushing according to the method described in Examples 5 to 14 and 18 to 26, dispersed in methylcyclohexane and activated either by trioctylaluminum (Activator A) or by dimethylethyldiethylsiloxalane (Activator B) in such a quantity that the atomic ratio Al/Ti is equal to 6 (in Example 34 Al/Ti=4).

Ethylene polymerization is continually effected in an autoclave reactor (having a volume of 0.6 L) under pressure of 400 bars (600 bars in Examples 33 to 35) by maintaining a temperature T and by injecting the so-prepared catalytic dispersion according to a flow such that the average residence time is about 30 seconds. In order to control melt index of polymer, hydrogen is injected in the reactor.

In Table IV catalyst nature is indicated by reference to one of the preceding examples, activator nature as set forth above, temperature in °C., hydrogen proportion in percent by volume, and catalytic yield $R_c$ in kilograms of polyethylene by milliatom of titanium (titanium and vanadium in Example 33). Melt index of the polymer MI is measured according to standard ASTM D 1238 and expressed in dg/mn and the polydispersity index defined by the ratio Mw/Mn is the weight average molecular weight to the number average molecular weight, these molecular weights being determined by gel permeation chromatography.

TABLE IV

| Ex. | Catalyst | Activator | T° C. | % $H_2$ | $R_c$ | MI | $M_w/M_n$ |
|---|---|---|---|---|---|---|---|
| 27 | 6 | A | 239 | 2 | 6.9 | | 3.4 |
| 28 | 6 | B | 245 | 1.5 | 5.6 | | 10 |
| 29 | 7 | B | 233 | 2 | 6.0 | 40 | 2.9 |
| 30 | 8 | A | 227 | 1 | 8.9 | | 3.1 |
| 31 | 13 | A | 212 | 1.5 | 6.3 | | 3.3 |
| 32 | 14 | A | 221 | 1.8 | 5.7 | | 4.5 |
| 33 | 18 | B | 230 | 0.5 | 4.2 | 5,6 | 7.7 |
| 34 | 21–22 | B | 230 | 0.5 | 5.6 | 3,9 | 6.9 |
| 35 | 21–22 | B | 230 | 2 | 7.6 | 37 | 5.6 |
| 36 | 20 | B | 228 | 2 | 5.8 | 54 | 3.2 |
| 37 | 23 | B | 234 | 1.9 | 5.7 | 27 | |
| 38 | 24 | B | 254 | 2 | 8.9 | 100 | |
| 39 | 24 | A | 235 | 1 | 9.6 | 23 | |
| 40 | 25 | A | 200 | 1 | 6.5 | | 3 |

EXAMPLES 41 and 42

Ethylene polymerization is effected in a cylindrical autoclave reactor in which a temperature of 240° C. and a pressure equal to 1,300 bars is maintained. The catalyst described in Example 5 (for Example 41) and the product obtained by crushing TAC 191 and anhydrous magnesium dischloride in the same atomic ratio Mg/Ti=10 (for the comparative Example 42) are used. These catalysts are activated with trioctylaluminum with an atomic ratio Al/Ti=3. The average residence time of each catalytic system in the reactor is 40 seconds. Table V gives the hydrogen percentage (by volume) in the reactor, the catalytic yield $R_c$ expressed in kilograms of polymer per gram of titanium, the melt index MI of the polymer (determined according to standard ASTM D 1238-73), the density $\rho$ of the polymer in g/cm$^3$, the proportion of very high molecular weights expressed by $$Mz = \frac{\int_0^\infty M^2 \cdot C(M)\, dM}{\int_0^\infty M \cdot C(M)\, dM}$$

(expressed in thousands and determined by gel permeation chromatography) the breaking strength BS (measured according to standard ISO R 527 and expressed in kg/cm$^2$) and the limit strength in flexion LSF (measured according to NF 51 001 and expressed in kg/cm$^2$)

EXAMPLES 43, 44, 45 and 46 (Comparative)

Ethylene is polymerized under a pressure 1000 bars in a stirred autoclave reactor comprising 3 zones. The first zone supplied with catalyst and with ⅓ of the total supply of monomer is maintained at a temperature of 210° C.; the second zone supplied with ⅓ of the total supply of monomer only is maintained at 180° C.; the third zone, supplied with catalyst and ⅓ of the total supply of monomer is maintained at 260° C.

Following catalysts are used; the catalyst of Example 25 (for Example 43), the catalyst of Example 8 (for Example 44), the catalyst of Example 12 (for Example 45), and a product which is obtained by crushing together TAC 191 and anhydrous magnesium dichloride in the same atomic ratio Mg/Ti equal to 3 (for the comparative Example 46). These catalysts are activated by their respective activators with a ratio Al/Ti=3 (Activator A is used in Examples 44 to 46, Activator B is used in Example 43). The average residence time of each catalytic system in the reactor is 75 seconds. Table V gives the polymer properties described in the two former examples.

TABLE V

| Example | 41 | 42 | 43 | 44 | 45 | 46 |
|---|---|---|---|---|---|---|
| % H$_2$ | 0.04 | 0.12 | 0.05 | 0.04 | 0.04 | 0.2 |
| R$_c$ | 273 | 123 | 127 | 100 | 142 | 100 |
| MI | 0.4 | 0.4 | 0.4 | 0.7 | 0.2 | 0.4 |
| ρ | 0.953 | 0.954 | 0.955 | 0.956 | 0.954 | 0.953 |
| Mz | 430 | 345 | 460 | 460 | 475 | 370 |
| BS | 355 | 280 | 320 | 330 | 305 | 270 |
| LSF | 260 | 195 | 170 | 160 | 175 | 170 |

What is claimed is:

1. A catalyst comprising the product obtained by bringing into contact
   (a) a compound of magnesium comprising at least one species selected from the group consisting of magnesium mono-halides (MgX) (MgX$_2$)$_a$ (Mg)$_b$ (MgO)$_c$, X being a halogen and said magnesium mono-halide being obtained by thermal decomposition of a powdery organo-magnesium halide R$_1$MgX prepared in the absence of any solvent, wherein R$_1$ is an organic radical, and wherein 0.1≦a≦0.5, 0≦b≦0.45, and 0≦c≦0.25; and
   (b) at least one halide of a transistion metal selected from the group consisting of titanium and vanadium, the valency of said metal in said halide being lower than or equal to 3, the quantities of (a) and (b) being such that the atomic ratio of magnesium to said transition metal is between 1 and 25.

2. A catalyst comprising the product obtained by bringing into contact
   (a) a compound of magnesium comprising at least one species selected from the group consisting of halomagnesium hydrides (HMgX) (MgX$_2$)$_b$ [Mg(OR)$_2$]$_c$, X being a halogen and said halomagnesium hydride being obtained by thermal decomposition of a powdery organomagnesium halide R$_1$MgX prepared in the absence of any solvent, wherein R$_1$ is an organic radical, and wherein R is a hydrocarbon radical, 0≦a≦0.75, 0≦b≦0.70, and 0≦c≦0.25; and
   (b) at least one halide of a transition metal selected from the group consisting of titanium and vanadium, the valency of said metal in said halide being lower than or equal to 3, the quantities of (a) and (b) being such that the atomic ratio of magnesium to said transition metal is between 1 and 25.

3. The catalyst of claim 2 wherein said species is formed by thermal decomposition at a temperature between 170° and 220° C. of an organomagnesium halide in which R$_1$ is an aliphatic radical.

4. The catalyst of claim 1 wherein said species is formed by thermal decomposition at a temperature higher than 300° C., of an organomagnesium halide in which R$_1$ is an aliphatic radical.

5. The catalyst of claim 3 or 4 wherein the organomagnesium halide is n-butylmagnesium chloride or n-butylmagnesium bromide.

6. The catalyst of claim 1 wherein said species is formed by thermal decomposition at a temperature higher than 250° C. of an organomagnesium halide in which R$_1$ is an aromatic radical.

7. The catalyst of claim 1 wherein X is selected from the group consisting of chlorine or bromine.

8. The catalyst of claim 1 wherein the transition metal halide of compound (b) is titanium trichloride, titanium dichloride, vanadium trichloride or mixtures thereof.

9. The catalyst of claim 8 wherein the compound (b) is violet titanium chloride (TiCl$_3$ ⅓ AlCl$_3$).

10. The catalyst of claim 1 in which the compounds (a) and (b) are brought together by crushing them together in an inert and perfectly anhydrous atmosphere.

11. A catalytic system comprising a catalyst according to claim 1 and further comprising an activator selected from the group consisting of hydrides and organometallic compounds of metals of groups I to III of the Periodic Table, wherein the atomic ratio of the metal of said activator to the transition metal of the catalyst is between 0.1 and 100.

12. A catalytic system according to claim 11 wherein the activator is an alkylaluminum or an alkylsiloxalane.

13. A catalytic system according to claim 12 in which the activator is trioctylaluminum.

14. A catalytic system according to claim 12 in which the activator is dimethylethyldiethylsiloxalane.

15. A catalyst consisting essentially of the product obtained by bringing into contact
   (a) a compound of magnesium comprising magnesium hydride (MgH$_2$); and
   (b) at least one halide of a transition metal selected from the group consisting of titanium and vanadium, the valency of said metal in said halide being lower than or equal to 3,
the quantities of (a) and (b) being such that the atomic ratio of magnesium to said transition metal is between 1 and 25.

16. The catalyst of claim 1, 2, or 15, wherein the compound (b) is a vanadium compound.

17. The catalyst of claim 2, wherein 0.1≦a≦0.5, 0≦b≦0.45 and 9≦c≦0.25.

18. The catalyst of claim 1, wherein compound (a) has a specific surface greater than 50 m$^2$/g.

19. The catalyst of claim 2, wherein compound (a) has a specific surface greater than 150 m$^2$/g.

* * * * *

UNITED STATES PATENT AND TRADEMARK OFFICE
CERTIFICATE OF CORRECTION

PATENT NO. : 4,263,170
DATED : April 21, 1981
INVENTOR(S) : KAREL BUJADOUX

It is certified that error appears in the above-identified patent and that said Letters Patent are hereby corrected as shown below:

Claim 2, lines 5 and 6:

Correct the formula "$(HMgX)\ (MgX_2)_b\ [Mg(OR)_2]_c$" to read:

--$(HMgX)\ (MgX_2)_a\ (MgH_2)_b\ [Mg(OR)_2]_c$--.

Claim 17, line 2, change "$9 \leqq$" to --$0 \leqq$--.

Signed and Sealed this

Twenty-third Day of June 1981

[SEAL]

Attest:

RENE D. TEGTMEYER

Attesting Officer   Acting Commissioner of Patents and Trademarks

UNITED STATES PATENT AND TRADEMARK OFFICE
CERTIFICATE OF CORRECTION

PATENT NO. : 4,263,170
DATED : April 21, 1981
INVENTOR(S) : KAREL BUJADOUX

It is certified that error appears in the above-identified patent and that said Letters Patent are hereby corrected as shown below:

Column 6, line 17 (Example 3), change $MgH_2$ to --Mg--.

Column 7, line 10, change "compound (2)" to --compound (a)--.

Column 7, line 22, change "theylene" to --ethylene--.

Column 8, line 6, insert --is-- before "dispersed".

Signed and Sealed this

Seventh Day of September 1982

[SEAL]

*Attest:*

*Attesting Officer*

GERALD J. MOSSINGHOFF

*Commissioner of Patents and Trademarks*